United States Patent
Sims et al.

(10) Patent No.: US 11,124,368 B2
(45) Date of Patent: Sep. 21, 2021

(54) SYSTEM AND METHOD FOR ZERO DEFECT CARTON REJECTION

(71) Applicant: W. H. LEARY CO., INCORPORATED, Tinley Park, IL (US)

(72) Inventors: Andrew Sims, New Lenox, IL (US); Keith Patrick Clarke, Manhattan, IL (US); Christopher Michael Leary, Homer Glen, IL (US)

(73) Assignee: W. H. Leary Co., Tinley Park, IL (US)

( * ) Notice: Subject to any disclaimer, the term of this patent is extended or adjusted under 35 U.S.C. 154(b) by 0 days.

(21) Appl. No.: 16/819,381

(22) Filed: Mar. 16, 2020

(65) Prior Publication Data

US 2021/0016978 A1     Jan. 21, 2021

Related U.S. Application Data

(60) Provisional application No. 62/281,810, filed on Mar. 18, 2019.

(51) Int. Cl.
| | |
|---|---|
| *B65G 47/50* | (2006.01) |
| *B65G 47/31* | (2006.01) |
| *B65G 47/88* | (2006.01) |

(52) U.S. Cl.
CPC .......... *B65G 47/503* (2013.01); *B65G 47/31* (2013.01); *B65G 47/8815* (2013.01);
(Continued)

(58) Field of Classification Search
CPC ........ B65H 29/60; B65H 29/62; B65H 29/66; B65H 2701/1766; B65H 33/12;
(Continued)

(56) References Cited

U.S. PATENT DOCUMENTS

| | | | |
|---|---|---|---|
| 3,464,537 A | * | 9/1969 | Thull .................. B65H 29/669 198/369.7 |
| 4,143,771 A | | 3/1979 | Wieser |

(Continued)

*Primary Examiner* — William R Harp
(74) *Attorney, Agent, or Firm* — Wood, Phillips, Katz, Clark & Mortimer

(57) ABSTRACT

A post compression carton rejection system for receiving cartons in-line from a carton assembly system having a compression conveying section for compressing folded and glued cartons for delivery to a packing system. The post compression carton rejection system comprise a frame adapted to be supported between the compression conveying section and the packing system. An infeed conveyor is mounted to the frame and has an infeed belt for transporting folded and glued cartons from the compression conveying section and an infeed drive for driving the infeed belt. An outfeed conveyor is mounted to the frame between the infeed conveyor and a conveyor exit proximate the packer, in use, and comprises a nose extension conveyor having an outfeed belt including a dump gate controllably retractable at the conveyor exit to selectively dump folded and glued cartons, an outfeed drive for driving the outfeed belt and a dump gate actuator for opening and returning the dump gate. A controller operatively controls the infeed drive, the outfeed drive and the dump gate actuator to selectively create gaps before and after a stream of defective folded and glued cartons and dump the defective folded and glued cartons at the dump gate.

20 Claims, 12 Drawing Sheets

(52) U.S. Cl.
CPC ............... *B65G 2203/0233* (2013.01); *B65G 2203/044* (2013.01); *B65G 2811/095* (2013.01)

(58) Field of Classification Search
CPC .. B65G 47/503; B65G 47/31; B65G 47/8815; B65G 2203/0233; B65G 2203/044; B65G 2811/095; B31B 50/006
USPC ................................................ 198/594, 812
See application file for complete search history.

(56) References Cited

U.S. PATENT DOCUMENTS

| | | | |
|---|---|---|---|
| 5,342,278 A | | 8/1994 | Kurandt |
| 5,555,968 A | * | 9/1996 | Seefeldt ................. B65H 29/36 198/594 |
| 6,672,582 B2 | | 1/2004 | Dittli et al. |
| 6,866,135 B2 | * | 3/2005 | Quadracci .............. B65G 21/14 198/361 |
| 6,971,979 B1 | * | 12/2005 | Saro ......................... B26D 7/18 493/12 |
| 8,167,136 B2 | * | 5/2012 | Betti ......................... B26D 7/18 209/620 |
| 8,479,912 B2 | * | 7/2013 | Layne .................... B65G 47/71 198/370.01 |
| 9,394,133 B2 | * | 7/2016 | Knoefel ................. B65H 31/10 |
| 9,517,912 B2 | | 12/2016 | Brizzi |
| 9,604,258 B2 | * | 3/2017 | Layne .................... B65G 21/14 |
| 2006/0000544 A1 | | 1/2006 | Hunter |
| 2009/0044497 A1 | | 2/2009 | Falat et al. |

\* cited by examiner

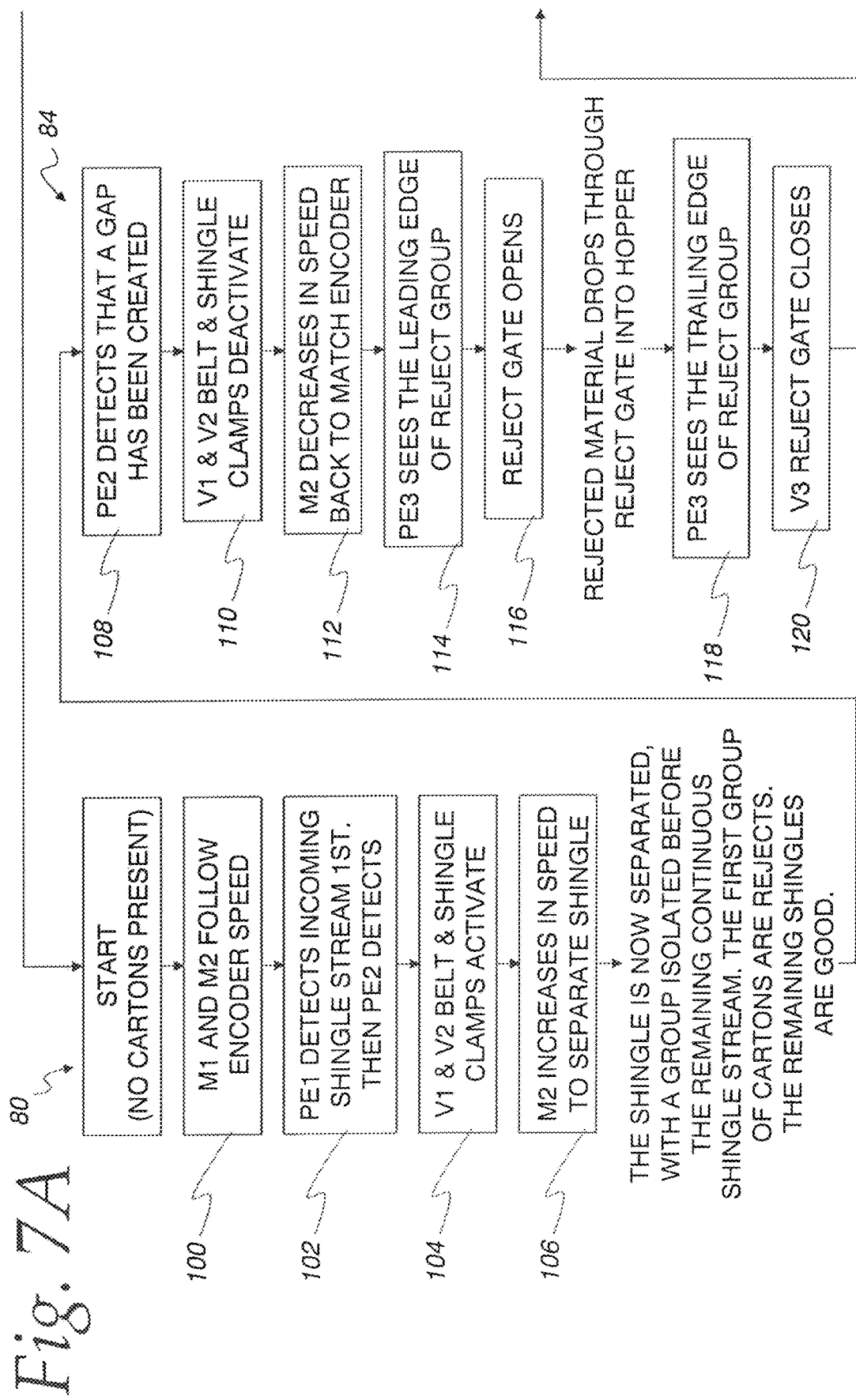

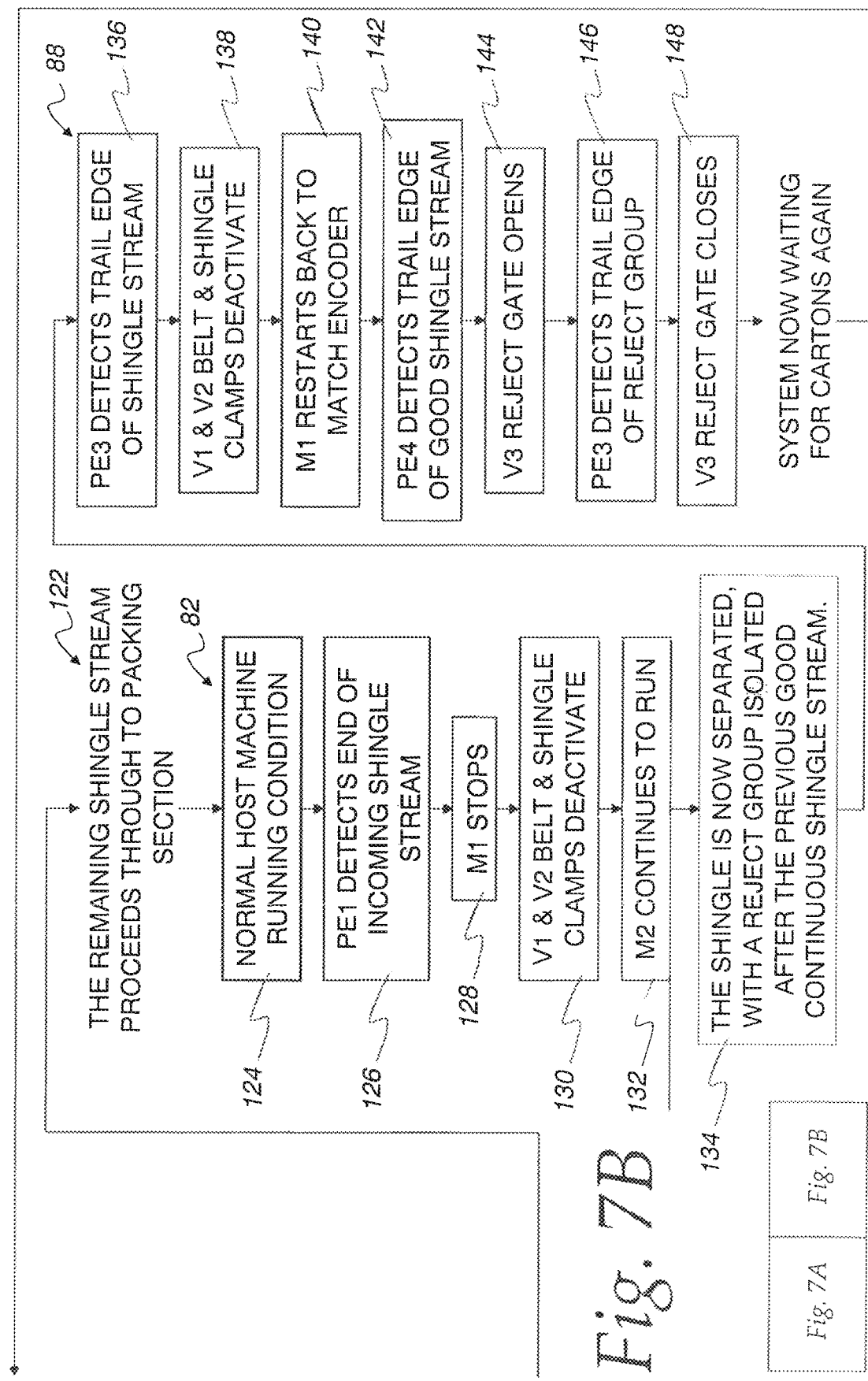

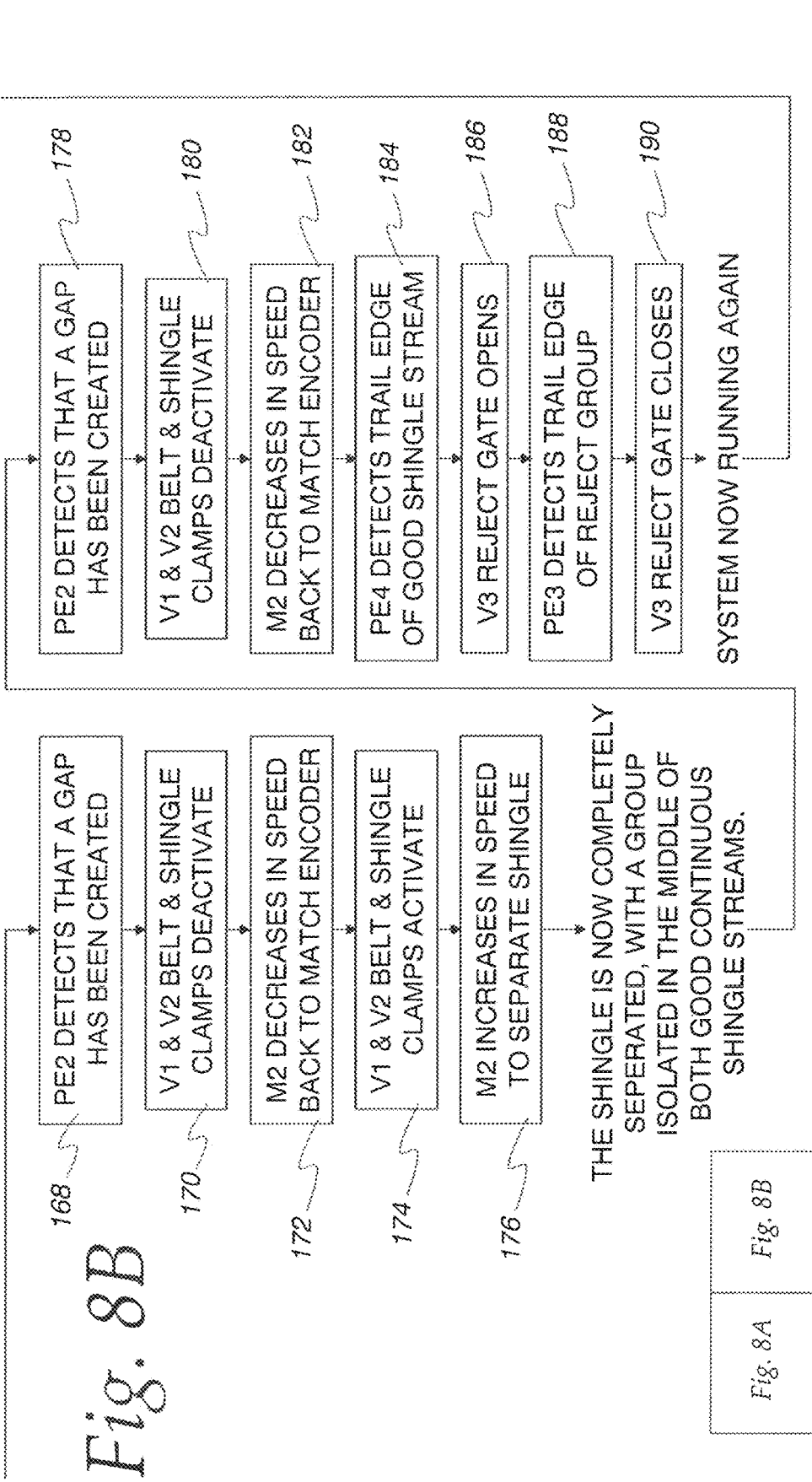

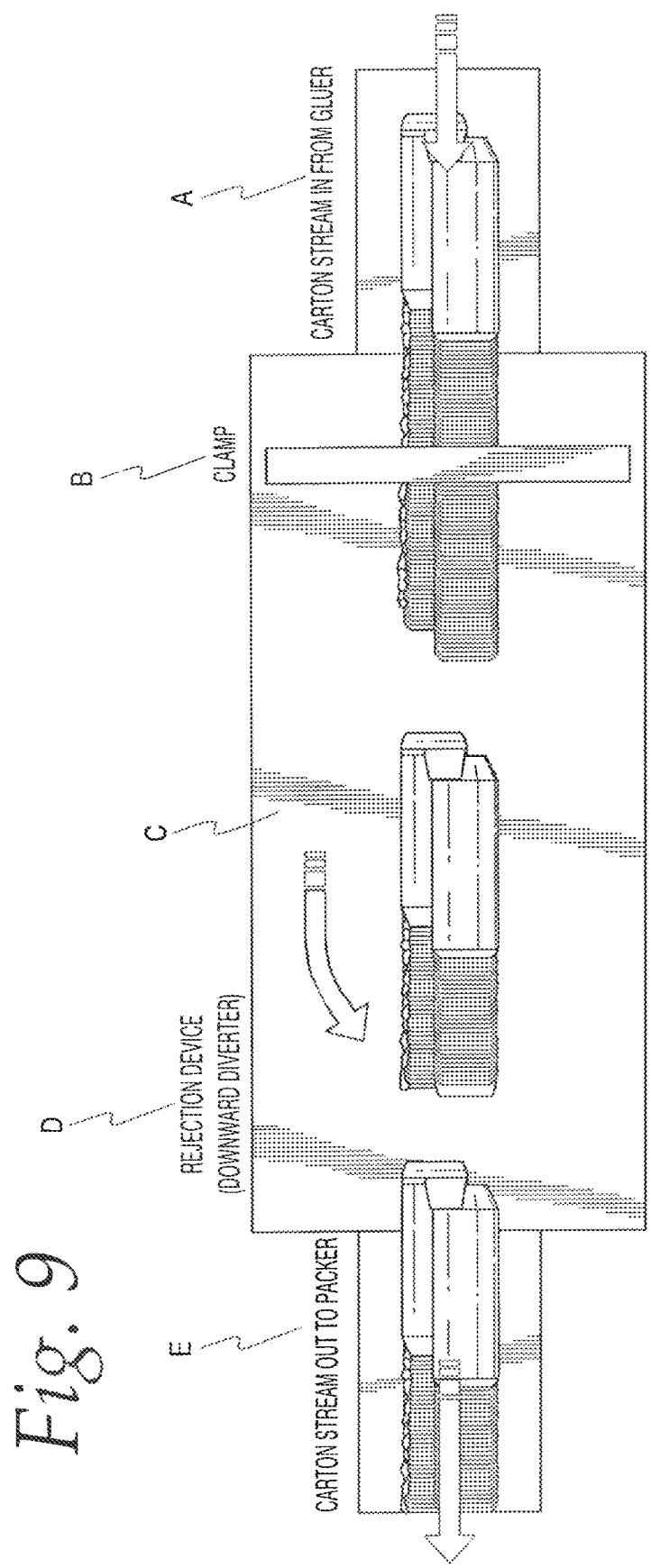

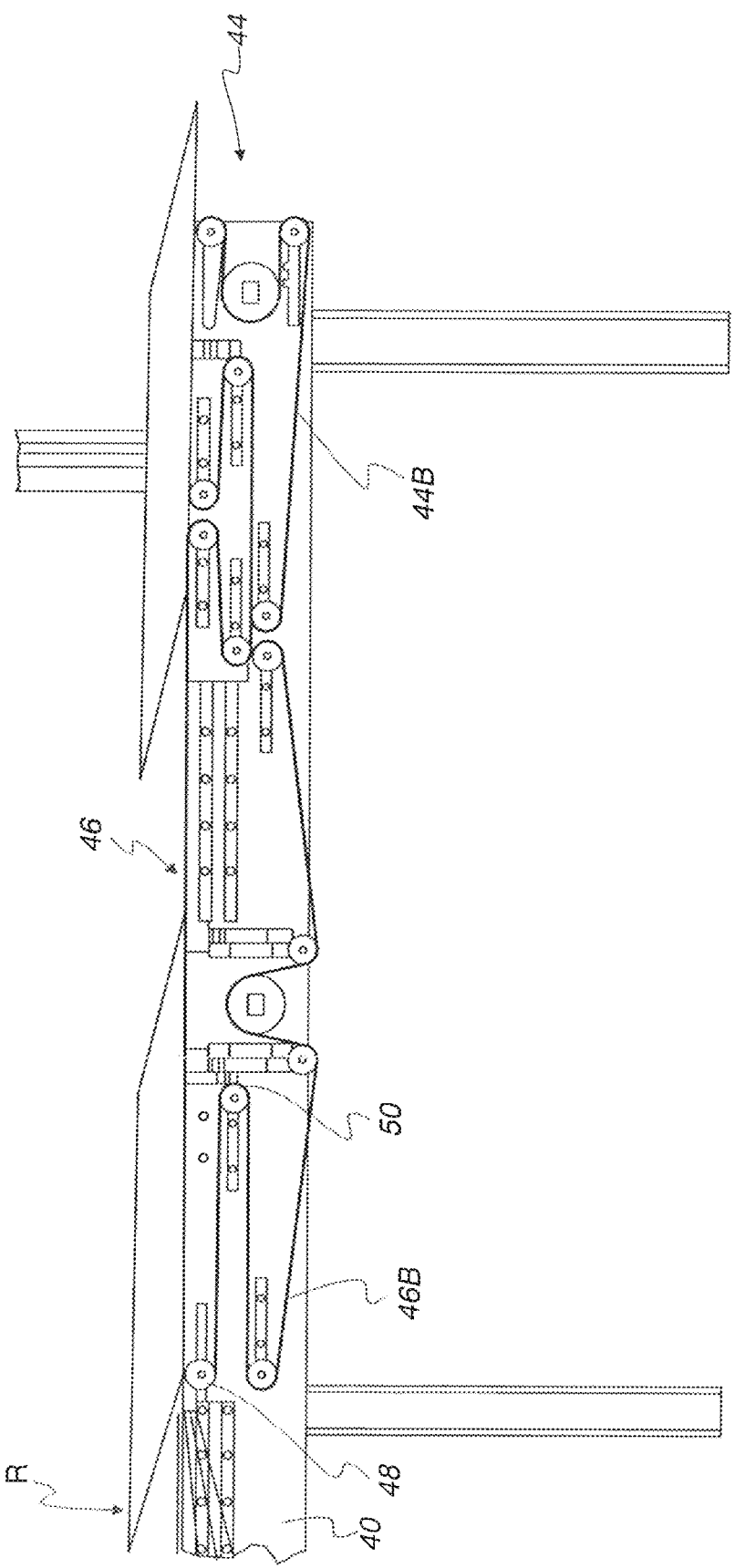

SYSTEM AND METHOD FOR ZERO DEFECT CARTON REJECTION

FIELD OF THE INVENTION

This invention relates to high-speed production, gluing and folding of feed stock to form cartons and, more particularly, to post compression rejection of cartons to advantageously provide zero defects.

BACKGROUND OF THE INVENTION

In carton assembly systems, the feed stock to form the carton moves on a conveyor past a glue station where glue is applied to a portion thereof. After the glue is applied to the carton, the carton is folded and pressure is applied to the carton while the glue dries. Sometime later, the cartons are filled with a product. If the cartons are improperly glued, the cartons may come apart, for example, during shipping, and the product may be damaged or lost.

Particularly, typical packaging automation systems include high-speed lines which take feed stock in the form of precut and printed paperboard, or the like, and form a packaging product, such as a carton, box, bag, envelope, or the like. These lines may produce up to 200,000 cartons per hour. The throughput will depend, in part, on the carton size. For simplicity herein, the packaging product will be referred to as a carton formed of paperboard. As will be apparent, the invention is not intended to be so limited.

Of relevance herein are systems which take the flat paperboard stock and at high speed add glue and fold the paperboard into a carton for use by the end customer. The most common complaint of folding carton suppliers is unglued cartons. Advantageously, the gluing apparatus will eliminate gluing defects. These defects typically occur if the folder/gluing machine stops. When this happens, there are cartons that have been glued but not folded due to a machine stop. Because of this, there is potential risk that the glue will dry on the carton. Known devices automatically remove cartons in a machine that have been glued but not folded. There are also a few cartons after the normal carton ejector that are not fully transferred into the compression belt. Because there is no pressure kept on those cartons, the flaps do not stay glued.

Due to machine stoppage, there are not many cartons that are potential defects. However, there is a risk of this occurring every time there is a machine stop. A trained operator will remove the defects. However, the operator may remove more than or fewer than are necessary. Also, relying on the operator to remove the defect can be insufficient with untrained operators or an operator that overlooks the removal during restart of the machine. For carton producers with highly automated lines, the manual removal is especially difficult.

The present invention is directed to automated rejection of cartons to eliminate defects.

SUMMARY OF THE INVENTION

There is disclosed in accordance with one aspect of the invention a post compression carton rejection system for receiving cartons in-line from a carton assembly system having a compression conveying section for compressing folded and glued cartons for delivery to a packing system. The post compression carton rejection system comprise a frame adapted to be supported between the compression conveying section and the packing system. An infeed conveyor is mounted to the frame and has an infeed belt for transporting folded and glued cartons from the compression conveying section and an infeed drive for driving the infeed belt. An outfeed conveyor is mounted to the frame between the infeed conveyor and a conveyor exit proximate the packer, in use, and comprises a nose extension conveyor having an outfeed belt including a dump gate controllably retractable at the conveyor exit to selectively dump folded and glued cartons, an outfeed drive for driving the outfeed belt and a dump gate actuator for opening and returning the dump gate. A controller operatively controls the infeed drive, the outfeed drive and the dump gate actuator to selectively create gaps before and after a stream of defective folded and glued cartons and dump the defective folded and glued cartons at the dump gate.

It is a feature that the post compression carton rejection system further comprises a clamp mounted to the frame above the infeed conveyor and having a clamp foot controlled by the controller for clamping folded and glued cartons to the infeed belt to create the gaps.

It is another feature that the post compression carton rejection system further comprises a clamp mechanism controlled by the controller for clamping the infeed belt.

It is a further feature that the controller controls speed of the infeed drive and the outfeed drive.

It is still another feature that the post compression carton rejection system further comprises a first proximity sensor at a beginning of the infeed conveyor, a second proximity sensor at an end of the infeed conveyor, a third proximity sensor at a beginning of the dump gate and a fourth proximity sensor at the conveyor exit, each connected to the controller to indicate presence or absence of folded and glued cartons.

The controller may be a programmable controller programmed to operate a lead edge separation routine to reject folded and glued cartons at a start of a carton shingle stream.

The controller may be a programmable controller programmed to operate a trail edge separation routine to reject folded and glued cartons at an end of a carton shingle stream.

The controller may be a programmable controller programmed to operate a middle stream separation routine to reject folded and glued cartons after a stoppage of the carton assembly system during a folding and gluing run.

It is a further feature that the controller is connected to a speed sensor for the compression conveying section and the controller controls speed of the infeed belt and the outfeed belt to follow velocity of the compression conveying section during normal operation.

It is still another feature that the controller selectively varies speed of the infeed belt and the outfeed belt to create the gaps.

There is disclosed in accordance with another aspect a post compression carton rejection method comprising: providing a system for receiving cartons in-line from a carton assembly system having a compression conveying section for compressing folded and glued cartons for delivery to a packing system, comprising a frame adapted to be supported between the compression conveying section and the packing system; providing an infeed conveyor mounted to the frame and having an infeed belt for transporting folded and glued cartons from the compression conveying section and an infeed drive for driving the infeed belt; providing an outfeed conveyor mounted to the frame between the infeed conveyor and a conveyor exit proximate the packer, in use, and comprising a nose extension conveyor having an outfeed belt including a dump gate controllably retractable at the conveyor exit to selectively dump folded and glued cartons, an outfeed drive for driving the outfeed belt and a dump gate actuator for opening and returning the dump gate; and controlling the infeed drive, the outfeed drive and the dump gate actuator using a programmable controller to selectively create gaps before and after a stream of defective folded and glued cartons and dumping the defective folded and glued cartons at the dump gate.

As described herein, a zero defect, post compression rejection system comprises a drop-in conveyor positioned between the compression section and the packer, or incorporated into the compression section itself. This device is fully automated and removes all uncompressed cartons. The device is designed to fit any machine and is independent of the quality control system so that it can be added to existing lines.

Particularly, when the carton production restarts, the system starts tracking by sending encoder pulses from the compression section to the post compression rejection system. This rejection system is adapted to clamp down immediately as the unglued cartons arrive at the rejection system and allow good cartons through. This has a result of holding the bad cartons. The clamp is then released to allow the bad cartons to start to pass through and the rejection system counts the distance to create a slug size based on the number of cartons to be rejected. The rejection system then clamps again after the unglued cartons have passed, which allows the slug of bad cartons through and holds the subsequent good cartons. The reject dump gate is opened to drop the slug of unglued cartons to a bin, after which the clamp is released to allow the good cartons through again and for the process to continue normally.

Features and advantages will be readily apparent from the specification and from the drawings.

BRIEF DESCRIPTION OF THE DRAWINGS

FIGS. 7A and 7B are detailed flow diagrams for the general cycle of a flow production run including a middle of run rejection version 1;

FIGS. 8A and 8B are detailed flow diagrams illustrating a middle of run rejection version 2;

FIG. 9 is an illustration of how the rejection device operates with a middle of run rejection; and FIG. 10 is a sectional view illustrating operation of the transport conveyors on the post compression rejection system and particularly showing the outfeed conveyor with a nose extension in a reject position to drop the rejected stream of cartons.

DETAILED DESCRIPTION OF THE INVENTION

As described herein, a carton assembly system and method are provided with apparatus and methodology for implementing a post compression, or zero defect, rejection system and method.

Figure 1:
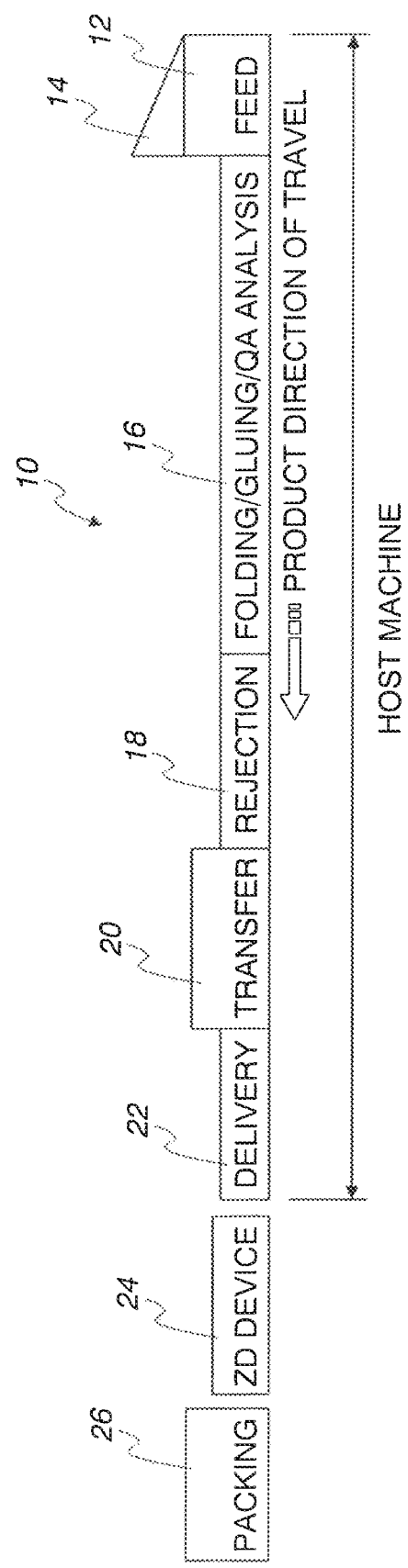
FIG. 1 is a generalized block diagram illustrating an exemplary production system and method for carton assembly including a post compression rejection system as described herein.

Referring to FIG. 1, a generalized block diagram illustrates an exemplary system for carton assembly. The carton assembly system comprises a high-speed line 10, also referred to as a host machine. The line 10 includes a feed unit 12 which feeds stock from a bin 14. The stock would typically be a flat, precut paperboard item, printed according to the user requirements.

Thereafter, the line 10 includes a folding gluing and QA analysis section 16 which applies glue, as necessary, to appropriate places on the carton and subsequently folds the carton into its assembled state. The QA analysis detects defects in the gluing and folding operation. A rejection section 18 is employed to reject a carton when an error has been found in the QA analysis. If not rejected, then the cartons proceed via a transfer section 20 to a delivery section 22 and subsequently via a zero defect (ZD) post compression rejection system 24, according to the invention, to a packing section 26 for delivery to the customer.

The configuration of the line 10 herein is intended to be by way of example only and is entirely dependent on the requirements for carton assembly. For example, there may be multiple gluing stations and fold stations, as necessary or desired. An example of such a system is illustrated in Leary et al U.S. Pat. No. 5,375,722, owned by the assignee of the present application, the specification of which is incorporated by reference herein.

Figure 2:
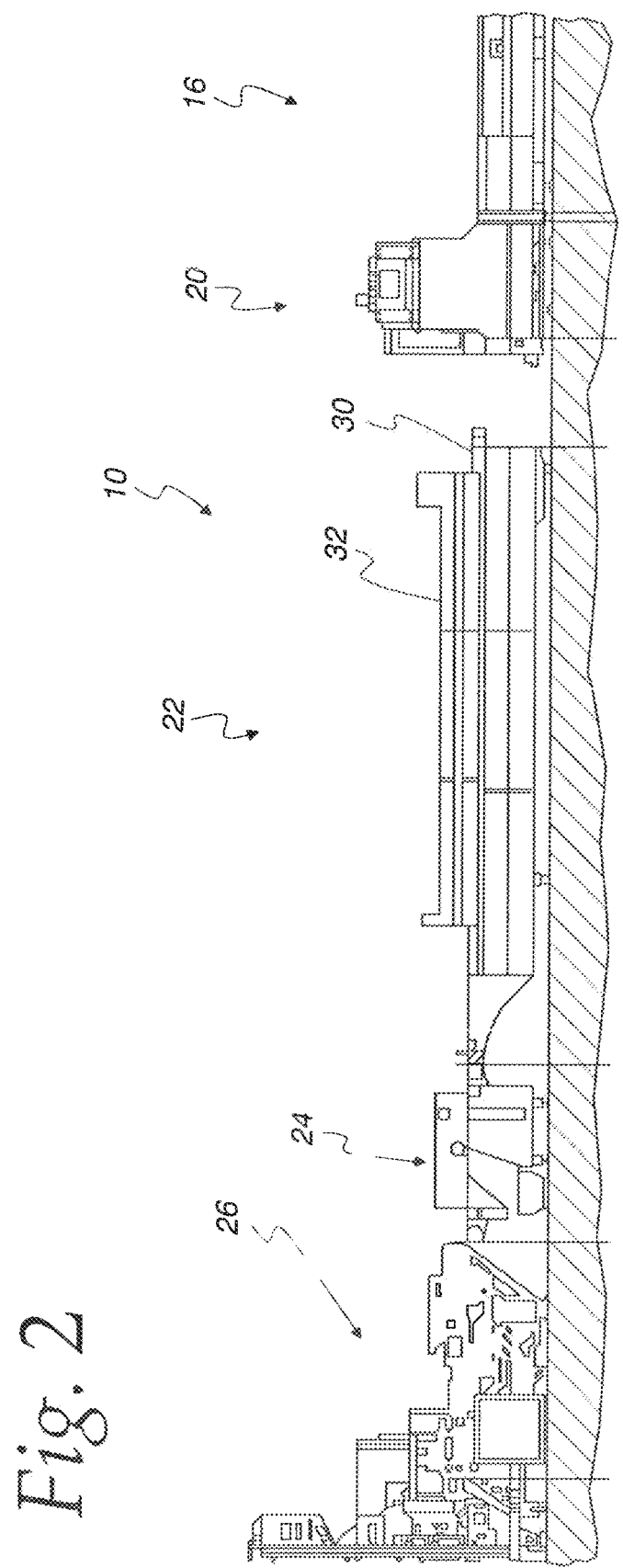
FIG. 2 is a side view of an actual production system and method for carton assembly including a post compression rejection system mounted in-line.

FIG. 2 illustrates a side elevation view of portions of the exemplary high-speed line 10. As illustrated therein, the cartons are folded and glued and then transferred from the transfer section 20 to the delivery section 22. As is well known, the cartons are all spaced apart during the folding and gluing operation. As they are transferred to the delivery section 22, the cartons are shingled in the transfer section 20 by being stacked with an overlap, prior to being compressed. The delivery section 22 includes a belt 30 which operates at a slower speed than that of the gluer/folder 16. A compression apparatus, generally identified as 32, may use rollers and/or belts, or the like, to maintain pressure on the shingled cartons through the delivery section while the glue dries. In a conventional line, the stacked cartons would be delivered directly from the delivery section 22 to the packing section 26. If the machine stops, there are some cartons which are just being transferred from the transfer section 20 to the delivery section 22 that are not yet under full compression. If the machine is stopped for more than a few seconds, then the glue dries, and this results in a weak or no bond on the glue seam. In accordance with the invention, the post compression rejection system 24 can be inserted in-line between the delivery section 22 and the packer 26, as shown, to eliminate the manual removal of the defective cartons. The host system 10 knows that any cartons that have entered the compression section will be satisfactory and knows the distance between the beginning of the compression section 32 to the post compression rejection system 24. The post compression rejection system 24, as described herein, comprises a short section of infeed conveyor that transports the stream from the delivery section 22 and includes a stationary clamp device which impedes the flow of the stream. The system 24 includes a second, longer and wider outfeed conveyor to transport the product and separate the stream when the clamp is activated. The system 24 includes a rejection device, as described below, to dump the rejected cartons.

This application is particularly directed to the post compression rejection system 24 which is operable to reject cartons post compression, and at the beginning and end of a cycle and in the middle of the cycle if there is a machine stoppage.

Figure 3:
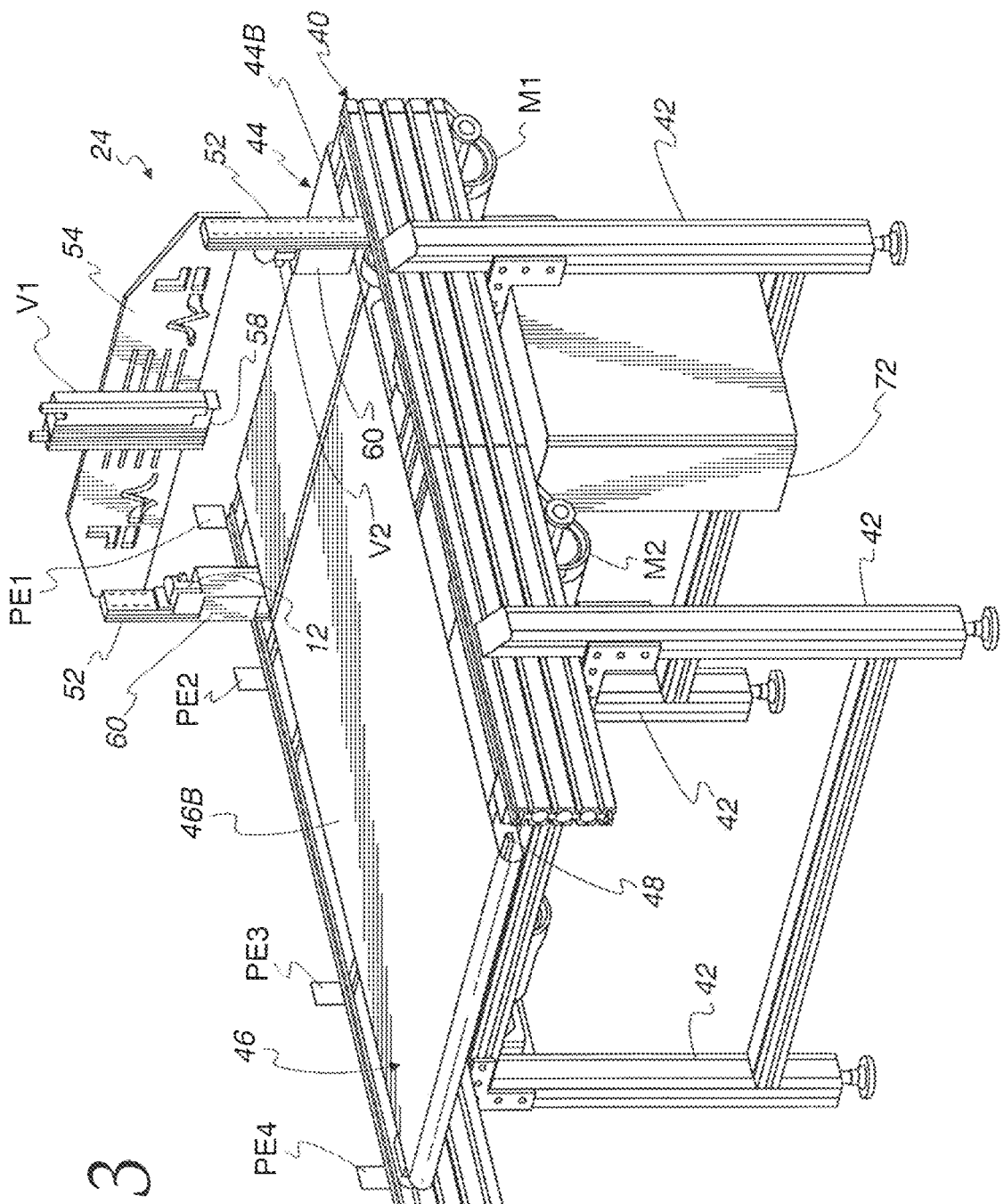
FIG. 3 is a perspective view of the post compression rejection system.
Figure 4:
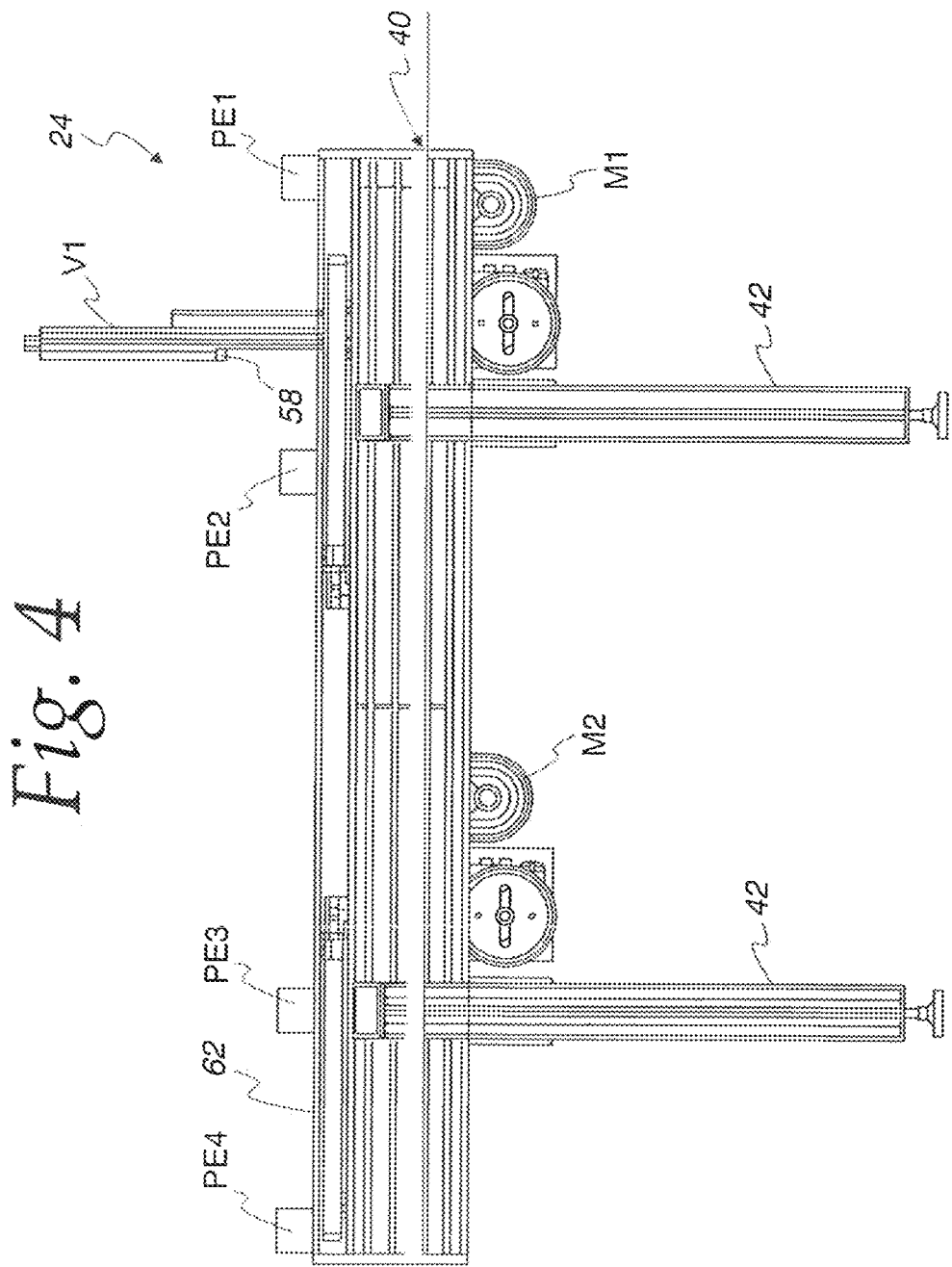
FIG. 4 is a side elevation view of the post compression rejection system.

Referring to FIGS. 3 and 4, the post compression rejection system 24 comprises a frame 40 supported on legs 42. The frame 40 supports an infeed conveyor 44 having an infeed belt 44B and an outfeed conveyor 46 having an outfeed belt 46B. A first motor M1 drives the infeed belt 44B. A second motor M2 drives the outfeed belt 46B.

The outfeed conveyor 46 comprises a conventional nose extension reject conveyor, as is well known. The exit end of the outfeed smart belt 46 is retracted in a conventional manner by moving a front roller 48 backwards. A second roller 50, shown in FIG. 10, is linked to the front roller 48 in a known manner, not shown, to maintain belt tension. FIG. 3 shows the outfeed 46B in the normal position, FIG. 10 shows the outfeed belt 46B in the retracted or dump position, to define a dump or reject gate R.

The post compression rejection system 24 includes a plurality of proximity sensors for detecting presence or absence of cartons on the conveyors 44 and 46. A first sensor PE1 detects the beginning and end of carton shingle stream fed onto the infeed conveyor 44. A second sensor PE2 at the beginning of the outfeed conveyor 46 detects a lead edge and monitors for a creation of a gap. A third sensor PE3 detects the presence of shingle stream at a dump gate open position, see FIG. 10. A fourth sensor PE4 detects the presence of shingle stream at the exit of the outfeed conveyor 46, where cartons are fed to the packer 26.

The post compression rejection system 24 includes a plurality of air cylinders which are controlled by solenoid valves (not shown). A pair of arms 52 extend upwardly from the frame 40 by the exit of the infeed conveyor 44 and support a cross piece 54. The cross piece 54 supports a main clamp cylinder V1 operating a clamp foot 58 on its underside. The main clamp foot 58 is adapted to steady and hold a shingle stream during operation.

A pair of second solenoids V2 operate clamp mechanisms 60 on each arm 52 to grab the infeed belt 44B. The solenoids V2 also operates internal cylinders to return the clamp carriage to home. A pair of third solenoids V3 operates internal cylinders 62, see FIG. 4, which operate as a dump gate actuator to move the linkage, not shown, to reposition the rollers 48 and 50, as discussed above, to open and return the dump gate R. The operation of the linkage under control of the dump gat actuator cylinders 62 is well known and not described in detail herein.

Figure 5:
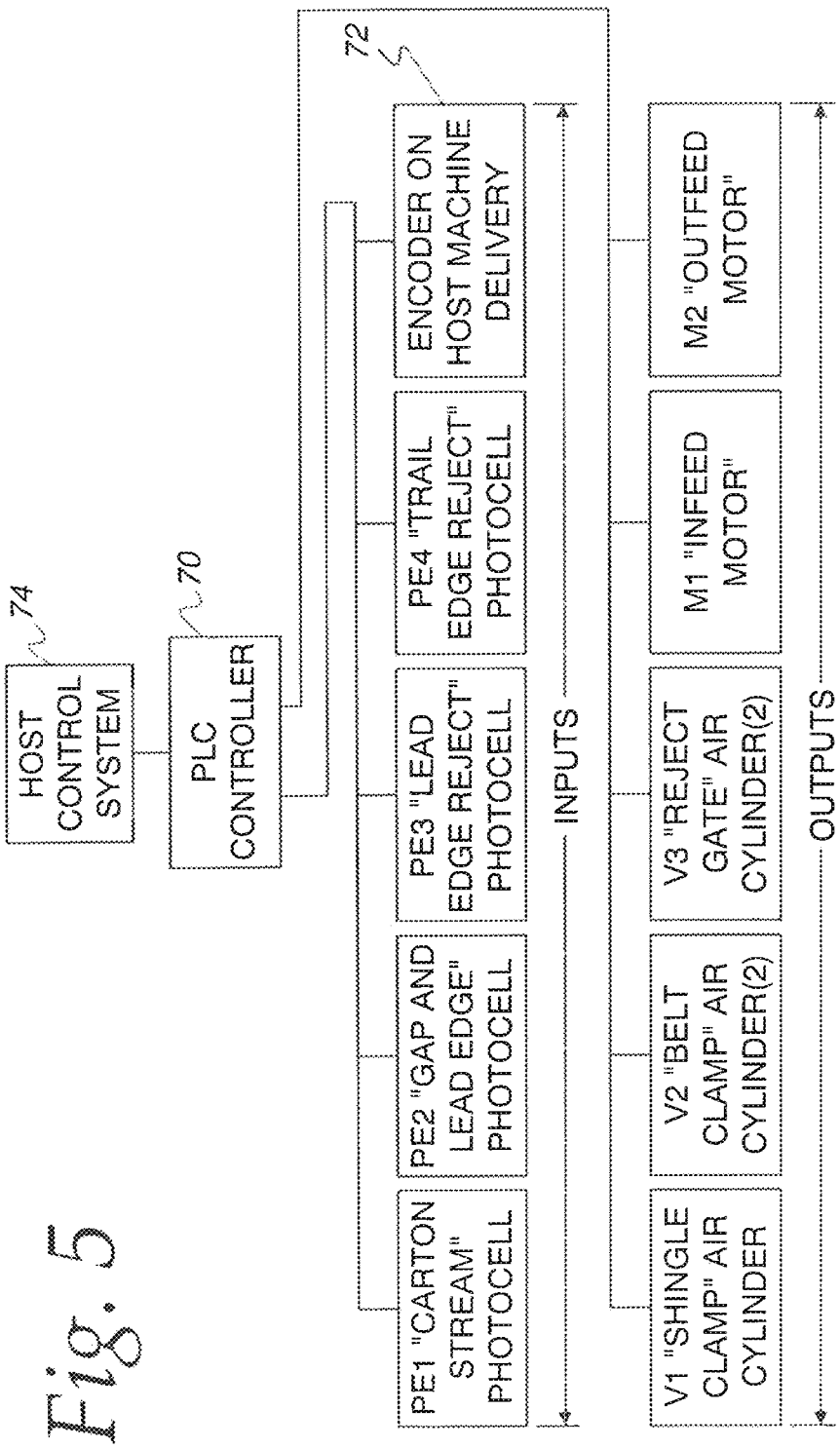
FIG. 5 is a block diagram of a control system for the device of FIG. 2.

Referring to FIG. 5, the operation of the post compression rejection system 24 is controlled by a programmed PLC controller 70. The controller 70 is connected to the four proximity sensors PE1, PE2, PE3 and PE4 as inputs. There is also an encoder 72 at the delivery section 22 from the host machine 10 to provide information on transfer conveyor speed. As output devices, the controller 40 controls the solenoid valves V1, V2 and V3 as well as the speed and operation of the infeed motor M1 and outfeed motor M2. The motors M1 and M2 are speed controlled to normally match the speed of the host system 10 and speed is selectively varied to create gaps in the shingled cartons, as described below, to implement the reject operation.

The PLC controller 70 may communicate with a computer-based control system 74 for the host machine 10 to reduce the number of inputs necessary from the operator to the post compression rejection system 24. Such a control system 74 uses dynamic operating software for control of the host machine 10, electronic gluing and quality assurance and does not form part of the invention.

Figure 6:
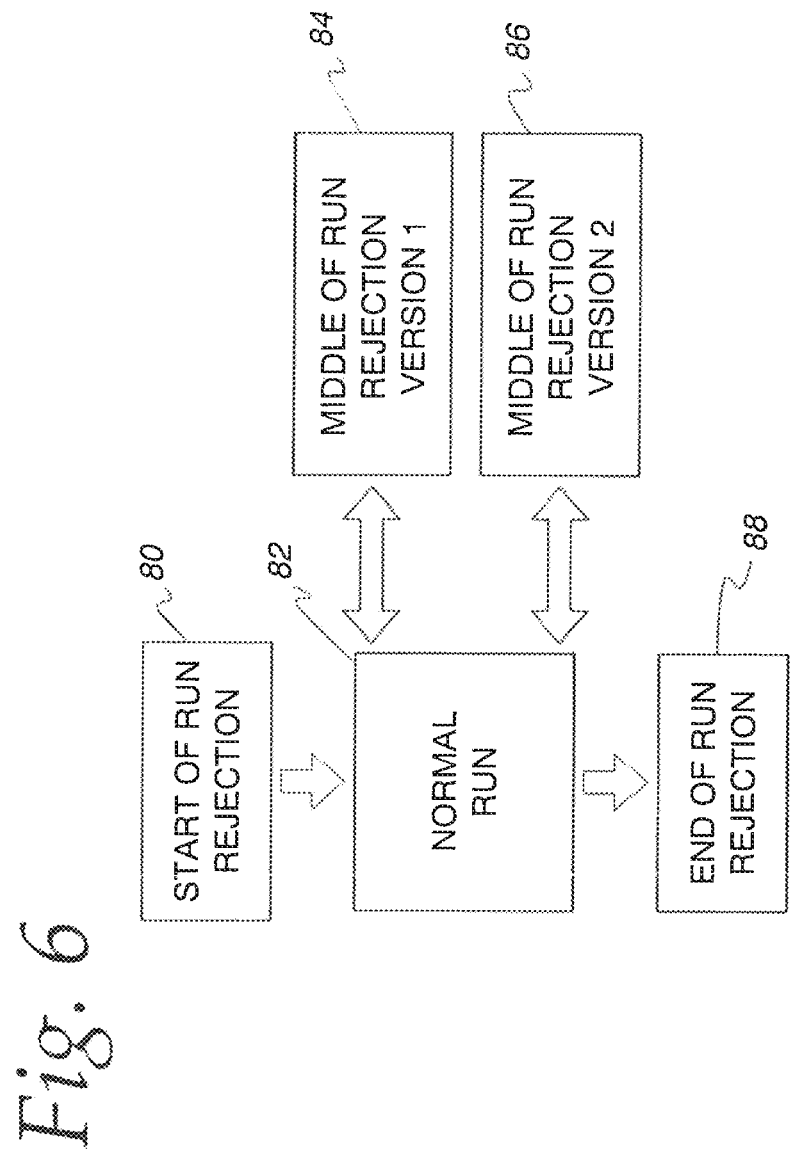
FIG. 6 is a generalized block diagram of logic flow implemented in the PLC controller of FIG. 5.

Referring to FIG. 6, a generalized diagram illustrates operation of logic flow implemented in the PLC controller 70 for implementing post compression, zero defect rejection. This program begins at a block 80 which implements a start of run rejection routine in which cartons are rejected at the start of a carton shingle stream at machine start up. Thereafter, the program implements a normal run routine at a block 82 which is a continuous operation for gluing and folding and delivery to the packer 26. If the machine stops and starts, for any reason, during the normal run, then the program can implement one of a middle of run rejection version 1 at a block 84 or a middle of run rejection version 2 at a block 86. At the end of the normal run routine, then an end of run rejection routine 88 rejects the end of carton shingle stream using a trail edge separation routine.

Figure 8A:
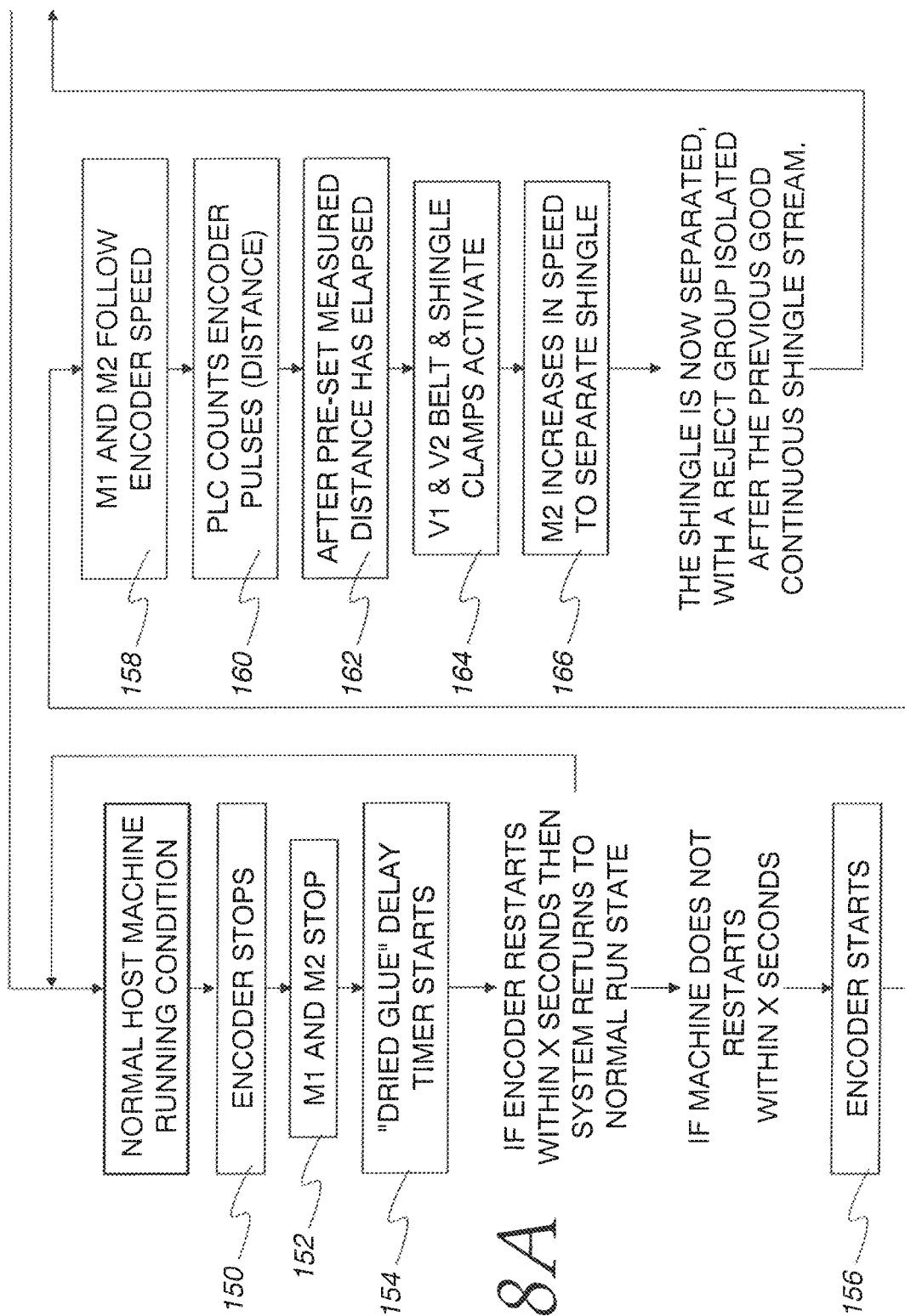

FIGS. 7A and 7B illustrate a more detailed logic flow diagram implementing the start of run rejection routine 80, the normal run routine 82, the middle of run rejection version 1 routine 84 and the end of run rejection routine 88. FIGS. 8A and 8B illustrate in greater detail the middle of run rejection version 2. During a production run, the system will use one of version 1 at the block 84 and version 2 at the block 86 depending upon the type of interruption of the run that is experienced.

The PLC controller 70 operates in one of four programmed modes and uses a selector switch (not shown) to set the mode manually. As will be appreciated, the mode could be set automatically by the host control system 74.

The programmed modes include an auto mode in which the post compression rejection system 24 creates gap separation at head and tail ends of the shingle, and in the middle of the shingle after a stop. Suspect material is dumped, and good material is delivered to the packer 26 downstream. With a purge mode, the dump gate opens, gap creation is disabled, and all material is dumped. With a bypass mode, the system acts as a pass-through conveyor. With a clean mode, the system rejects an additional number of cartons so that cartons still in the gluer at the time of the machine stop will also be rejected. This rejects cartons that may have had glue applied but were not yet folded.

The following is a detailed description of the auto mode logic for the lead edge separation routine, implemented at the block 50, the trail edge separation routine, implemented at the block 58, and the middle stream separation routine implemented at the block 54 or 56. These explain what is illustrated in the flow charts of FIGS. 7A, 7B, 8A and 8B. Lead Edge Separation Routine (Reject Start of Carton Shingle Stream at Block 50)—all 4 PE's are Open for 5 Seconds (Auto Reset)

1. M1 and M2 follow velocity of compression apron via upstream encoder speed pulse, block 100.
2. PE2 is adjustable and set to slightly past one carton length from the clamp foot 58, this setting will determine how many cartons are reject at both the beginning and end of the shingle.
3. PE1 and then PE2 are sequentially closed indicating lead edge of the shingle, block 102
4. V1 and V2 switch clamping the belt and dropping the foot simultaneously, block 104.
5. M2 increases in velocity (1.5×) pulling the lead edge separating the reject material from the shingle stream, block 106.

6. Once PE2 becomes open indicating the gap was created, block 108, V1 and V2 switch releasing the belt, block 110, raising the foot 58 and M2 returns to following velocity (1×), block 112.
7. PE3 reads the lead edge of the reject material, block 114, and operates V3 opening the dump gate R, block 116.
8. PE 3 reads the trail edge of reject material, block 118, and operates V3 closing the dump gate, block 120.
9. Good material is then continuously delivered to the packer, see 122.

Trail Edge Separation Routine (Reject End of Carton Shingle Stream at Block 58)—all 4 PE's are Closed and Detecting a Continuous Shingle State
1. M1 and M2 follow velocity of compression apron via encoder pulse, block 124.
2. PE 1 becomes open signaling the end of the shingle stream, block 126.
3. M1 stops, block 128, V1 and V2 operate clamping the shingle to the belt, block 130.
4. M2 continues to run (1×) separating the shingle from the trail edge, block 132.
5. M2 continues to deliver the shingle into the packer, block 134. Once PE3 detects trailedge of good product, block 136, V1, V2 reset, block 138, then % second later M1 restarts (1×), block 140 to match the encoder speed.
6. PE4 detects end of good product into the packer, block 142, V3 operates opening dump gate R, block 144.
7. PE3 detects trail edge of reject product, block 146, and closes once material is dumped, block 148.

Middle Stream Separation Routine (Reject Cartons after Machine Stop During Run at Block 54 or 56)—all 4 PE's are Closed and Detecting a Continuous Shingle State
1. If the compression apron stops during the run, this will be detected by the encoder. After a preset delay time (i.e. 20 seconds), this routine will be enabled, blocks 150, 152 and 154.
2. When the compression section restarts, the encoder will measure a preset distance (i.e. 15 ft) which is the measured distance between the start of the compression apron and the ZD conveyor, blocks 156, 158 and 160.
3. After the measure distance has elapsed, block 162, V1 and V2 switch, block 164, clamping the belt and dropping the foot simultaneously.
4. M2 increases in velocity (1.5×), block 166, separating the reject material from the shingle stream.
5. Once PE2 becomes open indicating the 1$^{st}$ gap was created, block 168, V1 and V2 switch releasing the belt, block 170, raising the foot and M2 returns to following velocity (1×), block 172.
6. Once the measure amount of cartons to be reject has passed V1 and V2 switch again clamping the belt and dropping the foot simultaneously, block 174.
7. M2 increases in velocity (1.5×), block 176, separating the reject material from the shingle stream
8. Once PE2 becomes open indicating the 2$^{nd}$ gap was created, block 178, V1 and V2 switch releasing the belt, block 180, raising the foot 58 and M2 returns to following velocity (1×), block 182.
9. PE4 detects end of good product into the packer 26, block 184, and V3 operates opening dump gate, block 186.
10. PE3 detects trail edge of reject product, block 188, and closes the dump gate R once reject material is dumped, block 190.
11. Good material is then continuously delivered to the packer.

FIG. 9 schematically illustrates the post compression rejection implemented by the system 24. The infeed from the compression belt 30 is illustrated at A. The clamp operation B is implemented by operating the shingle clamp air cylinder V1 which clamps the carton stream on the infeed conveyor 44. The outfeed conveyor 46 continues to operate at C to create a gap and the dump gate R is operated at D to downwardly divert the carton stream. The outfeed to the packer 26 is illustrated at E.

As noted above, FIG. 3 illustrates the outfeed conveyor 46 during normal operation, while FIG. 10 illustrates the outfeed conveyor 46 in the dump mode upon actuation of the dump gate cylinder V3 to open the dump gate R. As is evident, the roller 48, in the dump mode, is spaced away from the end of the frame 40 an amount to open the dump gate R. The roller 50 is similarly moved inwardly to maintain tension on the outfeed belt 46B.

More particularly, the routines described above, function so that when carton production restarts, the system starts tracking and counts encoder pulses to the PLC controller 70. The controller 70 clamps the cartons immediately before unglued cartons arrive which allows the good cartons through and holds bad cartons. The clamp 56 is released to allow bad cartons to start to pass through and counts the distance to create a slug size which may be on the order of 3 to 10 cartons. The system clamps again after the unglued cartons have passed which allows the slug of bad cartons through and holds the good cartons. The reject gate R is open to drop the slug of unglued cartons to a bind and then release the clamp to allow good cartons to go through again and resume normal operation.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The foregoing disclosure of specific embodiments is intended to be illustrative of the broad concepts comprehended by the invention.

The invention claimed is:

1. A post compression carton rejection system for receiving cartons in-line from a carton assembly system having a compression conveying section for compressing folded and glued cartons for delivery to a packing system, the post compression carton rejection system comprising:
   a frame adapted to be supported between the compression conveying section and the packing system;
   an infeed conveyor mounted to the frame and having an infeed belt for transporting folded and glued cartons from the compression conveying section and an infeed drive for driving the infeed belt;
   an outfeed conveyor mounted to the frame between the infeed conveyor and a conveyor exit proximate the packing system, in use, and comprising a nose extension conveyor having an outfeed belt including a dump gate controllably retractable at the conveyor exit to selectively dump folded and glued cartons, an outfeed drive for driving the outfeed belt and a dump gate actuator for opening and returning the dump gate; and
   a controller operatively controlling the infeed drive, the outfeed drive and the dump gate actuator to selectively create gaps before and after a stream of defective folded and glued cartons and dumping the defective folded and glued cartons at the dump gate.

2. The post compression carton rejection system of claim 1 further comprising a clamp mounted to the frame above the infeed conveyor and having a clamp foot controlled by the controller for clamping folded and glued cartons to the infeed belt to create the gaps.

3. The post compression carton rejection system of claim 1 further comprising a clamp mechanism controlled by the controller for clamping the infeed belt.

4. The post compression carton rejection system of claim 1 wherein the controller controls speed of the infeed drive and the outfeed drive.

5. The post compression carton rejection system of claim 1 further comprising a first proximity sensor at a beginning of the infeed conveyor, a second proximity sensor at an end of the infeed conveyor, a third proximity sensor at a beginning of the dump gate and a fourth proximity sensor at the conveyor exit, each connected to the controller to indicate presence or absence of folded and glued cartons.

6. The post compression carton rejection system of claim 1 wherein the controller is a programmable controller programmed to operate a lead edge separation routine to reject folded and glued cartons at a start of a carton shingle stream.

7. The post compression carton rejection system of claim 1 wherein the controller is a programmable controller programmed to operate a trail edge separation routine to reject folded and glued cartons at an end of a carton shingle stream.

8. The post compression carton rejection system of claim 1 wherein the controller is a programmable controller programmed to operate a middle stream separation routine to reject folded and glued cartons after a stoppage of the carton assembly system during a folding and gluing run.

9. The post compression carton rejection system of claim 1 wherein the controller is connected to a speed sensor for the compression conveying section and the controller controls speed of the infeed belt and the outfeed belt to follow velocity of the compression conveying section during normal operation.

10. The post compression carton rejection system of claim 9 wherein the controller selectively varies speed of the infeed belt and the outfeed belt to create the gaps.

11. A post compression carton rejection method comprising:
   providing a module for receiving cartons in-line from a carton assembly system having a compression conveying section for compressing folded and glued cartons for delivery to a packing system, comprising a frame adapted to be supported between the compression conveying section and the packing system;
   providing an infeed conveyor mounted to the frame and having an infeed belt for transporting folded and glued cartons from the compression conveying section and an infeed drive for driving the infeed belt;
   providing an outfeed conveyor mounted to the frame between the infeed conveyor and a conveyor exit proximate the packing system, in use, and comprising a nose extension conveyor having an outfeed belt including a dump gate controllably retractable at the conveyor exit to selectively dump folded and glued cartons, an outfeed drive for driving the outfeed belt and a dump gate actuator for opening and returning the dump gate; and
   controlling the infeed drive, the outfeed drive and the dump gate actuator using a programmable controller to selectively create gaps before and after a stream of defective folded and glued cartons and dumping the defective folded and glued cartons at the dump gate.

12. The post compression carton rejection method of claim 11 further comprising providing a clamp mounted to the frame above the infeed conveyor and having a clamp foot controlled by the controller for clamping folded and glued cartons to the infeed belt to create the gaps.

13. The post compression carton rejection method of claim 11 further comprising providing a clamp mechanism controlled by the controller for clamping the infeed belt.

14. The post compression carton rejection method of claim 11 wherein the controller controls speed of the infeed drive and the outfeed drive.

15. The post compression carton rejection method of claim 11 further comprising providing a first proximity sensor at a beginning of the infeed conveyor, a second proximity sensor at an end of the infeed conveyor, a third proximity sensor at a beginning of the dump gate and a fourth proximity sensor at the conveyor exit, each connected to the controller to indicate presence or absence of folded and glued cartons.

16. The post compression carton rejection method of claim 11 wherein the controller is programmed to operate a lead edge separation routine to reject folded and glued cartons at a start of a carton shingle stream.

17. The post compression carton rejection method of claim 11 wherein the controller is programmed to operate a trail edge separation routine to reject folded and glued cartons at an end of a carton shingle stream.

18. The post compression carton rejection method of claim 11 wherein the controller is programmed to operate a middle stream separation routine to reject folded and glued cartons after a stoppage of the carton assembly system during a folding and gluing run.

19. The post compression carton rejection method of claim 11 wherein the controller is connected to a speed sensor for the compression conveying section and the controller controls speed of the infeed belt and the outfeed belt to follow velocity of the compression conveying section during normal operation.

20. The post compression carton rejection method of claim 19 wherein the controller selectively varies speed of the infeed belt and the outfeed belt to create the gaps.

* * * * *

UNITED STATES PATENT AND TRADEMARK OFFICE
CERTIFICATE OF CORRECTION

| | |
|---|---|
| PATENT NO. | : 11,124,368 B2 |
| APPLICATION NO. | : 16/819381 |
| DATED | : September 21, 2021 |
| INVENTOR(S) | : Sims et al. |

It is certified that error appears in the above-identified patent and that said Letters Patent is hereby corrected as shown below:

On the Title Page

Item (60), should be corrected to read:
(60) Provisional application No. 62/819,810, filed on Mar. 18, 2019.

Signed and Sealed this
Third Day of May, 2022

Katherine Kelly Vidal
*Director of the United States Patent and Trademark Office*